United States Patent [19]
Andrianov et al.

[11] Patent Number: 5,814,704
[45] Date of Patent: Sep. 29, 1998

[54] RECOVERY OF POLYPHOSPHAZENE POLYACIDS OR ACIDS SALTS THEREOF

[75] Inventors: Alexander K. Andrianov, Belmont, Mass.; Jonathan R. Sargent, Los Angeles, Calif.; Sameer S. Sule, Marlboro, Mass.

[73] Assignee: Virus Research Institute, Inc., Cambridge, Mass.

[21] Appl. No.: 810,728

[22] Filed: Mar. 4, 1997

[51] Int. Cl.[6] .................................................... C08L 43/02
[52] U.S. Cl. ........................................ 525/209; 525/538
[58] Field of Search ..................................... 525/538, 209

[56] References Cited

U.S. PATENT DOCUMENTS

| | | | |
|---|---|---|---|
| 4,128,710 | 12/1978 | Fieldhouse et al. . | |
| 4,267,311 | 5/1981 | Elefritz, Jr. . | |
| 4,477,656 | 10/1984 | Longo et al. . | |
| 4,576,806 | 3/1986 | Juneau . | |
| 4,607,012 | 8/1986 | Selva et al. ............................. | 435/136 |
| 5,053,451 | 10/1991 | Allcock et al. ......................... | 524/600 |

OTHER PUBLICATIONS

Paul G. Gassman and William N. Schenk, J. Org. Chem. 42(5), 918–920.

*Primary Examiner*—Jeffrey T. Smith
*Assistant Examiner*—Wu C. Cheng
*Attorney, Agent, or Firm*—Elliot M. Olstein; Raymond J. Lillie

[57] ABSTRACT

A process for recovering a polyphosphazene polyacid or acid salt obtained by hydrolyzing a polyphosphazene having at least one ester moiety present in at least one substituent group. The polyphosphazene having at least one ester moiety present in at least one substituent group is hydrolyzed with a base in an organic solvent in the presence of water. The water is present in an amount effective to induce the agglomeration of particles of the synthesized polyphosphazene polyacid or acid salt, which enhances the separation of the polyphosphazene polyacid or acid salt from a polymer-free liquid organic phase. The polymer-free liquid organic phase then is separated from the polyphosphazene acid or acid salt, whereby the polyphosphazene acid or acid salt is recovered.

12 Claims, No Drawings

RECOVERY OF POLYPHOSPHAZENE POLYACIDS OR ACIDS SALTS THEREOF

This invention relates to the recovery of water-soluble polyphosphazene polyacids and their salts. More particularly, this invention relates to the recovery of water-soluble polyphosphazene polyacids and their acid salts obtained by hydrolyzing water-insoluble polyphosphazenes containing ester moieties.

Polyphosphazene polyacids are useful as immunoadjuvants or materials for microencapsulation. These polymers usually are obtained by the multistep macromolecular substitution of poly(dichlorophosphazene). (Allcock, et al., *Polyphosphazenes as New Biomedical and Bioactive Materials,* Allcock, ed., Marcel Dekker, Inc., New York, pg. 163 (1990)). In general, the process includes synthesis of hydrophobic water-insoluble polymers with subsequent conversion to water soluble polyacids by introduction of acid groups, such as, for example, carboxylic acid groups. Polyphosphazenes containing ester moieties can be converted to polyphosphazene polyacids by hydrolysis. One example, poly[di (carboxylatophenoxy)phosphazene] (PCPP), is synthesized from polyphosphazene which includes hydrophobic propyl ester groups. Such hydrophobic propyl ester groups are hydrolyzed with an organic base (such as potassium tert-butoxide) in tetrahydrofuran (THF), and in the presence of catalytic amounts of water.

The recovery of polyphosphazene polyacids requires a final step of polymer isolation. In general, recovery and isolation of polymers is a complex process, due to the unique physical properties of macromolecules, such as high viscosity, stickiness and little or no volatility. ("Recovery and Isolation Techniques", in: *Concise Encyclopedia of Polymer Science and Engineering,* John Wiley & Sons, Inc., 1990, pg. 975). Recovery and isolation of polyphosphazene polyacids from the reaction mixture can be extremely difficult and in some cases unsuccessful due to the formation of stable fine dispersions of reaction by-products as described, for example, in U.S. Pat. No. 4,576,806 to Juneau, U.S. Pat. No. 4,477,656 to Longo, et al., U.S. Pat. No. 4,128,710 to Fieldhouse, et al., and U.S. Pat. No. 4,267,311 to Elefritz, Jr.

Methods for polyphosphazene polyacid recovery have been described; however, these methods are complex, and require the use of large quantities of solvents. The reaction mixtures usually are heterogeneous, containing finely distributed particles of raw materials, and reaction by-products. Such mixtures are difficult to process using conventional techniques. Recovery of polyphosphazene can be accomplished, for example, by a replacement of hydrophobic solvent with water, followed by a multistep purification procedure. Thus, PCPP was isolated by a complete homogenization of the reaction mixture by addition of ice water resulting in a 3.5-fold increase in the total volume, heating this homogenized mixture to evaporate THF, dialyzing through a cellulose tube, and precipitating the PCPP with an aqueous solution of hydrochloric acid, such as disclosed in U.S. Pat. No. 5,053,451 to Allcock, et al. The disadvantage of this method is that it requires the starting material, polyphosphazene containing ester moieties, to be free completely of water-insoluble contaminants, thus causing the need for vigorous multistep intermediate purifications of ester containing polyphosphazenes.

Similar methods of separation in which the solvent was replaced with water have been employed in purifying other polyphosphazene polyelectrolytes. Polyphosphazene polyelectrolytes were purified by addition of water to the reaction mixture, evaporation of THF, precipitation of the polymer with an aqueous solution of hydrochloric acid, multiple extractions with methylene chloride, and precipitation by using an excess of hexane. (Wisian-Nelson, et al., *Macromolecules,* Vol. 22, pgs. 4382–4384 (1989).) A polyphosphazene having sulfonic acid groups was separated by multiple extractions of polymer from dichloroethane in water and precipitation with potassium chloride. (Montoneri, et al., *J. Macromol. Sci.-Chem.,* Vol. A26, pgs. 645–661 (1989).)

It is therefore an object of present invention to provide an improved process for polyphosphazene polyacid recovery that reduces significantly the total volume of the reaction mixture, and also eliminates the need for additional recovery steps, such as energy-consuming solvent evaporation, as well as a need for the purification and isolation of an ester-containing polyphosphazene, thus allowing the preparation of polyphosphazene polyacid in one synthetic step.

In accordance with an aspect of the present invention, there is provided a process for recovering a polyphosphazene acid or acid salt, such as a polyphosphazene carboxylic acid or a polyphosphazene carboxylic acid salt, obtained by hydrolyzing a polyphosphazene having at least one ester moiety present in at least one substituent group. The process comprises hydrolyzing the polyphosphazene, having at least one ester moiety present in at least one substituent group, with a base, in an organic solvent in the presence of water to convert each ester moiety to a corresponding acid moiety or acid salt moiety, wherein water is present in the reaction mixture in an amount effective to induce the agglomeration of finely divided particles of the synthesized polyphosphazene acid or acid salt, whereby there is formed a solid phase including said polyphosphazene acid or acid salt, and a liquid organic phase, containing the organic solvent, and which also may contain initial reagents and reaction by-products. The polyphosphazene acid or acid salt then is isolated and recovered by any means known to those skilled in the art, such as decantation, centrifugation, or filtration.

In one embodiment, there is obtained a polyphosphazene acid product wherein each phosphazene unit of the polyphosphazene acid product has the formula:

(I)

At least one, preferably both, of $R_1$ and $R_2$ is a substituent group including an acid moiety such as a carboxylic acid moiety or an acid salt such as a carboxylic acid salt. The polyphosphazene (I) is obtained by hydrolyzing a polyphosphazene wherein each phosphazene unit of the polyphosphazene has the formula:

(II)

At least one, preferably both, of $R_3$ and $R_4$ is a substituent group including an ester moiety, such as a carboxylic acid ester moiety.

Water is added to the reaction mixture in order to catalyze the hydrolysis reaction between the base and the polyphosphazene having the ester moieties, and to agglomerate the polyphosphazene having pendant acid moieties or pendant acid salt moieties. In one embodiment, the water is present in a water-organic solvent mixture in a total amount of from about 1% (v/v) to about 50% (v/v), preferably from about 10% (v/v) to about 20% (v/v).

Although the scope of the present invention is not intended to be limited to any theoretical reasoning, Applicants have found that, when one reacts a polyphosphazene having pendant ester moieties with a base in an organic solvent to yield a polyphosphazene having pendant acid moieties, such as carboxylic acid moieties or acid salt moieties such as carboxylic acid salt moieties, the polyphosphazene having the pendant acid moieties or acid salts is not in solution in the organic solvent, but rather, the polyphosphazene having the pendant acid moieties or acid salt moieties is dispersed throughout the organic solvent as a fine dispersion; however, no complete precipitation of polymer occurs. Applicants also have found that, if water is added to the reaction mixture, wherein the water is present in a water-organic solvent mixture within the ranges hereinabove described, the fine dispersion of polyphosphazene having pendant acid moieties or acid salt moieties will be agglomerated, thereby providing a two phase system containing a sediment of polyphosphazene having pendant acid moieties or acid salt moieties, and a polymer-free liquid organic phase. Such sediment or agglomerate is easy to filter or remove by any conventional method. There is no formation of continuous phase polyphosphazene gel, which is difficult to remove, or polyphosphazene solution under these conditions. Such method thus facilitates the recovery and isolation of the polyphosphazene having the pendant acid moieties or acid salt moieties without the need for increasing the volume of organic solvents and the total volume of the reaction mixture, followed by the evaporation of the organic solvent, or the addition of an excessive amount of organic non-solvent to facilitate complete precipitation. There also is no need to isolate and repurify the polyphosphazene having at least one ester moiety before the hydrolysis reaction, so the process comprising polyphosphazene ester synthesis and polyphosphazene ester hydrolysis to yield a polyphosphazene having acid moieties or acid salts can be conducted in one synthetic step. The recovered polyphosphazene acid or acid salt then can be repurified, if necessary or desirable for final applications, by adding water to dissolve the polyphosphazene acid or acid salt, followed by precipitation in non-solvents, such as solutions of salts of Group I elements such as sodium chloride, or solutions of ammonium salts, HCl, or ethanol, followed by recovery of the precipitated polyphosphazene acid or acid salt.

The base which is employed in the reaction may be any base which will provide for the hydrolysis of ester moieties on the polyphosphazene to the acid moieties or acid salt moieties. In one embodiment, the base has the formula:

$MOR_5$, wherein M is a Group I element or ammonium, and $R_5$ is hydrogen or an alkyl group having from 1 to 6 carbon atoms. In one embodiment, M is a Group I element, preferably potassium or sodium. In another embodiment, $R_5$ is hydrogen. In one preferred embodiment, M is potassium, $R_5$ is hydrogen, and the base is potassium hydroxide. In another preferred embodiment, M is sodium, $R_5$ is hydrogen, and the base is sodium hydroxide.

In another embodiment, $R_5$ is an alkyl group having from 1 to 6 carbon atoms, and preferably $R_5$ is tert-butyl. Thus, in another preferred embodiment, M is potassium, $R_5$ is tert-butyl, and the base is potassium tert-butoxide.

In another embodiment, the pendant ester moieties of the polyphosphazene having formula II are carboxylic acid ester moieties having the structure:

—O—$R_6$—COOR$_7$ $R_6$ is an aliphatic or aromatic hydrocarbon, and $R_7$ is an alkyl group having from 1 to 18 carbon atoms. In one embodiment, $R_6$ is phenyl. In another embodiment, $R_7$ is propyl and the pendant ester moiety is p-propylhydroxybenzoate.

Thus, through the reaction of the polyphosphazene having the above-mentioned ester moieties with a base, the hydrophobic moieties are converted to carboxylic acid moieties or carboxylic acid salts having the formulae:

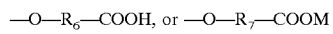

wherein $R_6$ is an aliphatic or aromatic hydrocarbon as hereinabove described. M is a Group I element or ammonium. In one embodiment, $R_6$ is phenyl.

Organic solvents which may be employed include, but are not limited to, diglyme (2-methoxyethyl ether, bis(2-methoxyethyl ether, diethylene glycol dimethyl ether), tetrahydrofuran (THF), or dioxane.

In a preferred embodiment, a polyphosphazene having the formula:

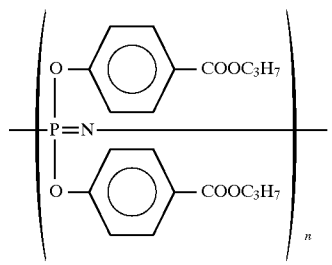

wherein n is an integer having a value of at least 3, preferably of at least 1,500, is reacted with a base such as potassium hydroxide or sodium hydroxide in the presence of diglyme and water. The water is present in a water-diglyme mixture in an amount of from about 12% (v/v) to about 15% (v/v) . During the reaction the hydrophobic polyphosphazene is converted to a hydrophilic polyphosphazene having the formula:

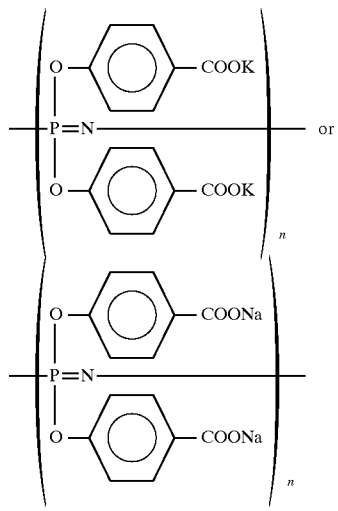

This polyphosphazene is present in the form of sediment or agglomerate in a two phase reaction mixture.

The poly[di(carboxylatophenoxy)phosphazene] may be recovered from the organic solvent and the base by any of a variety of means for liquid-solid separation. In one embodiment, the precipitated solid polyphosphazene is removed from the liquid phase containing organic solvent, raw materials, and reaction by-products by filtration. In another embodiment, the agglomerate can be separated from the liquid phase by centrifugation.

The recovered polyphosphazene having pendant acid moieties or acid salt moieties may be employed as an immunoadjuvant, as part of an immunogenic composition or vaccine, which is prepared by combining the polyphosphazene with an antigen.

The antigen can be derived from a cell, a bacterium, or a virus particle, or a portion thereof. As defined herein, the antigen may be a protein, peptide, polysaccharide, glycoprotein, glycolipid, nucleic acid, or combination thereof, which elicits an immunogenic response in an animal, for example, a mammal, bird, or fish. As defined herein, the immune response may be humoral or cell-mediated. In the event the material to which the immunogenic response is to be directed is poorly antigenic, the material may be conjugated to a carrier such as albumin or to a hapten, using standard covalent binding techniques, for example, with a commercially available reagent kit.

In one embodiment, the polymer is used to deliver a nucleic acid which encodes an antigen to a mucosal surface where the nucleic acid is expressed.

An immunogenic composition, or vaccine, may be prepared by combining the polymer adjuvant with an antigen. About 0.0001 to about 0.5 parts of antigen is added to one part polymer, preferably by stirring a solution of polymer and antigen until a solution or suspension is obtained, preferably for 10 minutes or more at 25° C. The polymer preferably is combined with the antigen by dispersing the antigen uniformly throughout the adjuvant. For example, the polymer may be liquefied by dissolving the polymer in an aqueous-based solvent, preferably having a pH of from about 7.1 to about 7.7. The antigen then is mixed with the polymer. The polymer and the antigen, in solid form (as for example when the antigen is lyophilized) also can be mixed together physically, such as, for example, by compression molding. The polymer also may be used to encapsulate the antigen, or by spray-drying a solution of the antigen. The polymer also may be used to encapsulate the antigen, by using for example, the methods disclosed in U.S. Pat. No. 5,149,543 to Cohen, et al., U.S. Pat. No. 5,529,777 to Andrianov, et al., or U.S. Pat. No. 5,500,161, to Andrianov, et al.

It will be understood by those skilled in the art that the immunogenic vaccine composition can contain other physiologically acceptable ingredients such as water, saline, or a mineral oil such as Drakeol$^{SM}$, Markol™, and squalene, to form an emulsion.

The immunogenic composition may be administered as a vaccine by any method known to those skilled in the art that elicits an immune response, including parenteral, oral, transmembranous, or transmucosal administration. Preferably, the vaccine is administered parenterally (intravenously, intramuscularly, subcutaneously, intraperitoneally, etc.), and more preferably, subcutaneously. Examples of mucosal administration include, but are not limited to, intranasal (in general, the nasal associated lymphoid tissue), respiratory, vaginal, and rectal administration.

The dosage of the composition is determined by the antigen loading and by standard techniques for determining dosage and schedules of administration for each antigen, based on the titer of antibody elicited by the polymer-antigen administration.

The invention now will be described with respect to the following example; however, the scope of the present invention is not intended to be limited thereby.

EXAMPLE

A polyphosphazene having the formula $[NP(OC_6H_4COOC_3H_7)_2]_n$ was obtained by macromolecular substitution of polydichlorophosphazene (57.52 ml of 4.66% (w/v) solution) with 85 g of p-propylhydroxybenzoate and 96 g of p-propylhydroxybenzoate, sodium salt in 333.52 ml of diglyme. The reaction mixture was refluxed at 160° C. for 10 hours. No isolation or purification of propyl ester polymer was performed. The reaction mixture was cooled down to 95° C. and 100 g KOH in 111 ml of water was added slowly with vigorous stirring. The deprotected polymer started to precipitate. 20 ml of water was added to ensure complete phase separation. The reaction mixture was cooled and the liquid organic phase was decanted. The polymer was then removed from the reaction flask and additionally purified by dissolution in water and precipitation in 30% (w/v) aqueous NaCl solution and then ethanol. The yield was 6.2 g (83%). The structure of PCPP was confirmed by $^1H$ and $^{31}p$ NMR. The weight average molecular weight of the obtained product was 970,000 g/mole as determined by aqueous phase GPC using a multiangle laser light scattering detector.

The disclosure of all patents and publications (including published patent applications) referenced in this specification are specifically incorporated herein by reference in their entirety to the same extent as if each such individual patent and publication were specifically and individually indicated to be incorporated by reference.

It is to be understood, however, that the scope of the present invention is not to be limited to the specific embodiments described above. The invention may be practiced other than as particularly described and still be within the scope of the accompanying claims.

What is claimed is:

1. A process for recovering a polyphosphazene acid or acid salt obtained by hydrolyzing a polyphosphazene having at least one ester moiety present in at least one substituent group, said process comprising:

(i) hydrolyzing said polyphosphazene, having at least one ester moiety present in at least one substituent group, with a base, in an organic solvent in the presence of water, to a corresponding acid or acid salt, and agglomerating said acid or acid salt by providing water in the water-organic solvent mixture in an amount of from about 1% (v/v) to about 50% (v/v), whereby there is formed a solid phase including said polyphosphazene acid or acid salt and a liquid organic phase including said organic solvent; and (ii) separating said liquid organic phase and said agglomerated polyphosphazene acid or acid salt.

2. The process of claim 1 wherein said base has the formula: $MOR_5$, wherein M is a Group I element or ammonium, and $R_5$ is hydrogen or an alkyl group having from 1 to 6 carbon atoms.

3. The process of claim 2 wherein M is potassium.

4. The process of claim 3 wherein $R_5$ is hydrogen.

5. The process of claim 1 wherein said organic solvent is diglyme.

6. The process of claim 1 wherein said polyphosphazene acid salt is the potassium salt of poly[di(carboxylatophenoxy)phosphazene].

7. The process of claim 1 wherein said polyphosphazene acid or acid salt is the sodium salt of poly[di(carboxylatophenoxy)phosphazene].

8. The process of claim 1 wherein said ester moiety is a p-propylhydroxybenzoate moiety.

9. The process of claim 1 wherein said polyphosphazene acid or acid salt recovered in step (ii) is repurified by the method comprising:
   (a) adding water in an amount sufficient to dissolve said polyphosphazene acid or acid salt;
   (b) adding a non-solvent selected from the group consisting of (i) a solution of a salt of a Group I element; (ii) a solution of an ammonium salt; (iii) HCl; and (iv) ethanol to precipitate said polyphosphazene acid or acid salt; and
   (c) recovering said precipitated polyphosphazene acid or acid salt.

10. The process of claim 9 wherein said non-solvent is a solution of a salt of a Group I element.

11. The process of claim 10 wherein said Group I element is sodium.

12. The process of claim 11 wherein said salt of a Group I element is sodium chloride.

* * * * *